US010472091B2

(12) United States Patent
Irish

(10) Patent No.: US 10,472,091 B2
(45) Date of Patent: Nov. 12, 2019

(54) METHOD AND APPARATUS USING A DRONE TO INPUT VEHICLE DATA

(71) Applicant: ADESA, Inc., Carmel, IN (US)

(72) Inventor: James Michael Irish, San Diego, CA (US)

(73) Assignee: ADESA, Inc., Carmel, IN (US)

( * ) Notice: Subject to any disclaimer, the term of this patent is extended or adjusted under 35 U.S.C. 154(b) by 215 days.

(21) Appl. No.: 15/367,510

(22) Filed: Dec. 2, 2016

(65) Prior Publication Data

US 2018/0155057 A1    Jun. 7, 2018

(51) Int. Cl.
| | | |
|---|---|---|
| *B64D 47/08* | (2006.01) | |
| *G08G 1/00* | (2006.01) | |
| *G08G 1/017* | (2006.01) | |
| *G05D 1/00* | (2006.01) | |
| *G06K 9/00* | (2006.01) | |
| *H04N 7/18* | (2006.01) | |
| *G08G 5/00* | (2006.01) | |
| *H04L 29/08* | (2006.01) | |
| *H04L 29/06* | (2006.01) | |
| *G06K 9/32* | (2006.01) | |

(52) U.S. Cl.
CPC ........ *B64D 47/08* (2013.01); *G05D 1/0094* (2013.01); *G06K 9/0063* (2013.01); *G06K 9/325* (2013.01); *G08G 1/0175* (2013.01); *G08G 1/205* (2013.01); *G08G 5/0039* (2013.01); *H04L 67/12* (2013.01); *H04N 7/183* (2013.01); *B64C 2201/127* (2013.01); *G08G 5/0069* (2013.01); *H04L 67/42* (2013.01)

(58) Field of Classification Search
CPC .... G08G 1/0175; G08G 1/205; G08G 5/0039; G05D 1/0094; B64C 2201/126; B64C 2201/127
See application file for complete search history.

(56) References Cited

U.S. PATENT DOCUMENTS 9,505,494 B1 * 11/2016 Marlow ................ B64C 39/024
9,508,263 B1   11/2016 Teng et al.
(Continued)

FOREIGN PATENT DOCUMENTS

EP    2071353 A2    6/2009
WO    2016130994 A1   8/2016

OTHER PUBLICATIONS

PCT Search Report dated Mar. 27, 2018, for corresponding PCT/US2017/064236.

*Primary Examiner* — Abby Y Lin
*Assistant Examiner* — Kelly D Williams
(74) *Attorney, Agent, or Firm* — Lempia Summerfield Katz LLC

(57) ABSTRACT

An unmanned aerial vehicle is operated to utilize one or more tools included in an attachment assembly to obtain state measurements on an object being analyzed by the unmanned aerial vehicle. The attachment assembly can include one or more of a digital camera for capturing a digital image (or a series of images), a color meter for measuring a paint color, a thermographic camera for measuring infrared radiation, an electronic nose device for measuring odors, or an electronic distance measuring device for measuring a distance between objects. An operation of the unmanned aerial vehicle is then modified based on the obtained state measurements.

25 Claims, 9 Drawing Sheets

(56) References Cited

U.S. PATENT DOCUMENTS

| | | | |
|---|---|---|---|
| 2009/0157233 A1 | 6/2009 | Kokkeby et al. | |
| 2014/0257595 A1 | 9/2014 | Tillmann | |
| 2015/0336671 A1* | 11/2015 | Winn | B64C 39/024 |
| | | | 701/3 |
| 2016/0078759 A1* | 3/2016 | Nerayoff | G06Q 20/145 |
| | | | 701/3 |
| 2016/0307447 A1 | 10/2016 | Johnson et al. | |

* cited by examiner

METHOD AND APPARATUS USING A DRONE TO INPUT VEHICLE DATA

TECHNICAL FIELD

This disclosure relates to an unmanned aerial vehicle (UAV) including an attachment assembly for obtaining measurements, a vehicle management system including the UAV, and processes for operating the UAV within the vehicle management system to achieve tasks.

BACKGROUND

With rapid advances in network connectivity and UAV technology, the range of UAVs to travel greater distances from a command center has grown. With the ability to travel greater distances, the tasks and responsibilities assigned to UAVs have similarly grown.

DETAILED DESCRIPTION

The discussion below makes reference to a vehicle management system that includes the control and operation of a UAV. The UAV is constructed to include flight components for achieving unmanned flight, processing components for processing information, and uses an attachment assembly, which includes one or more attachment devices for obtaining respective state observation measurements. The attachment assembly may comprise one, any combination, or all of the following: a digital camera for capturing a digital image (or a series of images); a color meter for measuring a paint color; a thermographic camera for measuring infrared radiation; an electronic nose device for measuring odors; and/or an electronic distance measuring device for measuring a distance between objects. The UAV may further include a wireless communication interface for wirelessly communicating (e.g., receiving and/or transmitting) information with other computing devices that are within range of the UAV's wireless communication interface.

With these enhanced technological capabilities, and the additional range afforded to the UAV, the UAV may be utilized by the vehicle management system to achieve a number of sophisticated tasks.

Figure 1:
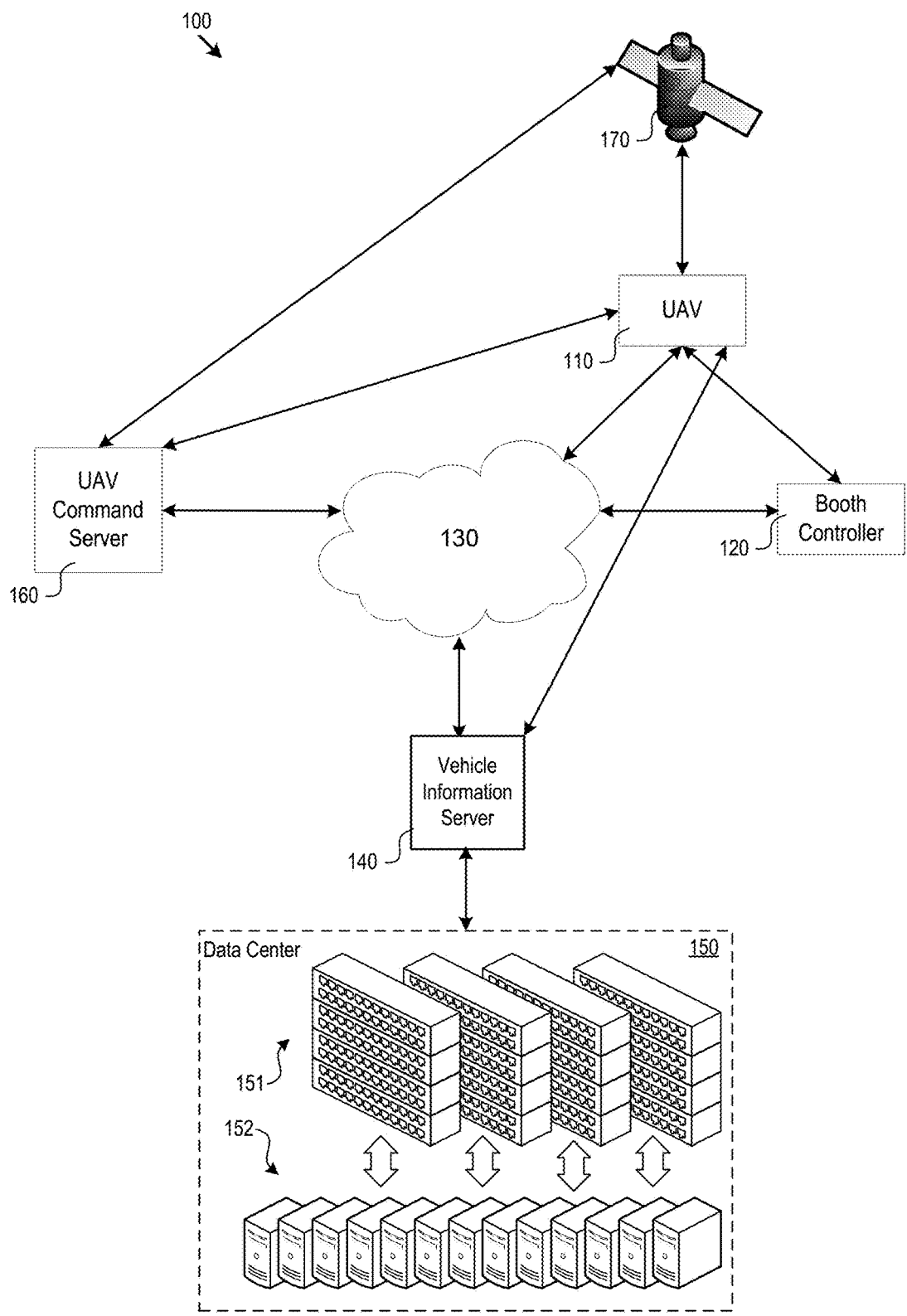
FIG. 1 shows an exemplary vehicle management system that includes an unmanned aerial vehicle (UAV).

FIG. 1 shows an exemplary vehicle management system 100 that includes UAV 110. The vehicle management system 100 further includes Global Positioning Satellite (GPS) 170, UAV command server 160, booth controller 120, vehicle information server 140, and data center 150.

Each of the components included in the vehicle management system 100 may be connected via a network 130 to allow for communication of information to and from each of the components that are connected to the network 130. The network 130 may be one or more of the following: a local area network; a wide area network; or any other network (such as a cellular communication network) that enables communication of data between computing communication devices. In one embodiment, network 130 may support wireless communications. Alternatively, or in addition, network 130 may support hard-wired communications, such as a telephone line or cable. Network 130 may also support the Ethernet IEEE (Institute of Electrical and Electronics Engineers) 802.3x specification. Network 130 may be the Internet and may support IP (Internet Protocol). Network 130 may be a LAN or a WAN. Network 130 may be a hotspot service provider network. Network 130 may be an intranet. Network 130 may be a GPRS (General Packet Radio Service) network. Network 130 may be any appropriate cellular data network or cell-based radio network technology. Network 130 may be an IEEE 802.11 wireless network or any suitable network or combination of networks. Although one network 130 is shown in FIG. 1, network 130 may be representative of any number of networks (of the same or different types) that may be utilized.

The network 130 may couple one or more computing devices that may interact with data captured and/or stored by the other components of the vehicle management system 100. For example, the network 130 may be coupled to a desktop computer, a laptop computer, or a mobile device such as a smart phone, tablet computer, or smart watch, that interacts with the data captured and/or stored by the UAV 110 or other components of the vehicle management system 100.

According to embodiments where the network 130 is coupled to a smart watch, the smart watch may be configured to allow for an inspector of a vehicle to communicate with the UAV 110 over the network 130 in real-time. For example, the inspector may input one or more of the following voice commands to the smart watch: "drone 123: please inspect vehicle X"; "drone 123: please detect smog." When the UAV 110 receives a voice command to detect smog, the UAV 110 may enter a smog inspection mode for conducting an emissions test on the vehicle. As part of the smog inspection mode, the UAV 110 may first control the vehicle to rev its engine to a predetermined speed (e.g., rotations per minute "RPM") while in park. To achieve this, the UAV 110 may send a command to the vehicle to rev the engine to the predetermined RPM. In addition or alternatively, the UAV 110 may communicate with an original equipment manager (OEM) service such as, for example OnStar, so that the OEM service controls the vehicle to rev the engine to the predetermined RPM. The UAV 110 may include sniffer components for measuring the different smog particles and products in the vehicle's emissions.

As another part of the smog inspection test administered by the UAV 110, the UAV 110 may send a command to the vehicle to turn on both the left and right blinkers to inspect the blinkers. The UAV 110 may communicate wirelessly with a microprocessor on the vehicle to determine whether the blinkers are working. In addition or alternatively, the UAV 110 may be equipped with a light sensor component for directly measuring a light emitted from the vehicle's blinkers.

As another part of the smog inspection test, the UAV 110 may inspect certain vehicles (e.g., trucks) by measuring a weight of the vehicle. The UAV 110 may be equipped with an attachment for attaching to the vehicle, where a weight of the vehicle is measured based on a tension force exerted on the attachment as the UAV 110 attempts to fly away from the vehicle while the attachment is attached to the vehicle.

In addition to communicating through the network 130, the UAV 110 may communicate directly, via wireless communication protocols, with one or more of the components described as being included in the vehicle management system 100 when the UAV 110 is within wireless communication range of the components. For example, the UAV 110 may include a wireless communication interface configured for direct wireless communication with another computing device according one or more known wireless communication protocols. Each wireless communication protocol may have its own distinct range for communicating with another computing device. A more detailed description of the UAV 110 is provided with reference to FIG. 2.

The data captured and/or stored by the other components of the vehicle management system 100 may be stored, for example, by the UAV 110 or may be routed by the vehicle information server 140 to be stored on the data center 150. The data center 150 may include a high density array of network devices, including cloud storage databases 151, and host servers 152. The host servers 152 support a unique set of computing functionality offered by the vehicle information server 140.

The vehicle information server 140 may store vehicle information gathered for a particular vehicle into a vehicle profile. One or more vehicle profiles may then be stored in the vehicle information server 140, or routed by the vehicle information server 140 to be stored on the cloud storage databases 151, according to vehicle identification information that identifies respective vehicles. Vehicle identification information may be, for example, a vehicle's unique VIN, license plate number, auction identification number when the vehicle has been processed into an auction database, or other unique identifier corresponding to the vehicle.

The vehicle information gathered by the vehicle information server 140 for inclusion into a vehicle profile may include a vehicle history report (VHR) that includes, for example, accidents reported for a vehicle. The VHR may be retrieved from a department of motor vehicles, vehicle title database, or third party reporting services. The vehicle information server 140 may further retrieve estimated value reports (EVR) on the vehicle from third party evaluation services, and include the retrieved EVR into a vehicle's vehicle profile. The EVR may describe a predicted price a client may expect to be able to resale the vehicle for, as well as an amount a client may expect to pay wholesale for the vehicle. Alternatively, or in addition, the vehicle information server 140 may retrieve make, model, vehicle build reports describing the vehicle attributes, and/or vehicle recall information obtained from a vehicle manufacturer, and include this information into a vehicle's vehicle profile. The vehicle information server 140 may further retrieve vehicle title information from a title holding entity, and include the title information into a vehicle profile. With the information gathered by the vehicle information server 140, a vehicle profile may include vehicle specifications, vehicle condition reporting (e.g., junk, salvage, total loss), vehicle title reporting, vehicle odometer readings, vehicle recall information, as well as other vehicle specific information such as evidence of past sales or past offers for sale (e.g., identifying past offers for sale on an online auction website), existing liens on the vehicle obtained from financial institutions, and vehicle accident reports obtained from police accident reports.

In one embodiment, when the UAV 110 obtains vehicle identification information (e.g., obtains a vehicle identifier), as described by one or more of the processes described herein, the UAV 110 may further transmit a request to the vehicle information server 140. The request may include the vehicle identification information obtained by the UAV 110, as well as a request for vehicle information corresponding to the vehicle identification information. For example, the UAV 110 may transmit a request to the vehicle information server 140 through the network 130, or alternatively, control a wireless communication interface on the UAV 110 to directly transmit the request to the vehicle information server 140 according to a wireless communication protocol. In response to receiving the request, the vehicle information server 140 may parse a database of vehicle profiles to locate a vehicle profile matching the vehicle identification information included in the request. After identifying the vehicle profile matching the vehicle identification information included in the request, the vehicle information server 140 may return the matching vehicle profile back to the UAV 110. According to some embodiments, the vehicle information server 140 may further generate a vehicle report based on the matching vehicle profile, and return the vehicle report to the UAV 110 along with the matching vehicle profile.

The UAV 110 may also have access to a shipping report that may be included in the vehicle report. The shipping report may identify vehicles based on their respective VIN numbers, and also describes vehicle equipment at the time the vehicles were shipped based on their VIN numbers. By accessing the shipping report, the UAV 110 may understand after-market add-ons to a vehicle that were not identified as part of the original equipment on the vehicle at the time of shipping. For example, when the UAV 110 detects a trailer hitch or roof rack that was not identified as part of the original equipment in the shipping report, the UAV 110 may determine such new equipment is either after-market or at least not part of the vehicle's original equipment. In one embodiment, the UAV 110 may be responsible for running the analysis to populate the shipping report. In another embodiment, the UAV 110 may access the shipping report from a third part source.

After receiving the vehicle profile, the UAV 110 may analyze the vehicle profile to generate a vehicle report. When a vehicle report generating application is installed on the UAV 110, the UAV 110 may directly generate the vehicle report based on the information included in the vehicle profile. In addition or alternatively, the UAV 110 may transmit the vehicle profile to the booth controller 120, where the booth controller 120 has installed the vehicle report generating application that analyzes the vehicle profile and generates the vehicle report based on the analysis. The vehicle report may include a vehicle inspection form that includes instructions and other information tailored for the vehicle identified by the corresponding vehicle profile. In one embodiment, the vehicle inspection form includes one or more fields that are pre-populated with information received from the UAV 110. As one example, the vehicle inspection form may include the vehicle identification information (e.g., the VIN) pre-populated in the form. As another example, the vehicle inspection form may be pre-populated with measurements taken by an attachment assembly of the UAV 110 (e.g., vehicle color, recognition of vehicle damage, recognition of vehicle accessories, distance between vehicle and another specified object). The vehicle report may further be generated to include tailored vehicle inspection protocols that identify inspection instructions that are relevant to the vehicle identified by the corresponding vehicle profile. For example, when the vehicle profile identifies a model year 2014 Ford F-150 truck in a XLT trim, the respective vehicle report may identify specific inspection instructions that are tailored for the vehicle due to its known larger dimensions, as well as instructions for inspecting vehicle specific parts that are known to have higher rates of failure as described in the vehicle profile (e.g., recall notices that are related to the model year 2014 Ford F-150 truck in a XLT trim).

The booth controller 120 may, for example, be part of a vehicle documentation booth as described by U.S. patent application Ser. No. 14/477,615, the entire contents of which are hereby incorporated by reference herein.

The UAV command server 160 may be a computing device configured to communicate operational commands to the UAV 110. The operational commands may include flight path plans for controlling aerial movement and positioning of the UAV 110. The operational commands may also include instructions for operating an attachment assembly included on the UAV 110. In operation, the UAV 110 may receive operational commands from the UAV command server 160, execute the operational commands, which then cause the UAV 110 to operate according to the flight path plans and instructions described by the operational commands. The UAV command server 160 may also keep track of the UAV 110's position by communicating with the UAV 110 directly, or by communicating the GPS 170 that is tracking the UAV 110.

The UAV command server 160 may also modify operational commands based on information received from one or more of the component devices included in the vehicle management system 100. For example, the vehicle profile and/or vehicle report may be received by the UAV command server 160 from the UAV 110, vehicle information server 140, or booth controller 120.

It follows that the vehicle management system 100 shown in FIG. 1 is enhanced by the advanced capabilities of the UAV 110 to accomplish a variety of unique tasks. For example, the UAV 110 may be operated to travel to a target location, where the target location may be described as the location of a target vehicle. After the UAV 110 confirms it has arrived at the target location, the UAV 110 may implement procedures to identify the target vehicle by scanning a vehicle identification number (VIN) on the target vehicle. As the target location may include more than one vehicle, the UAV 110 may be operated to scan more than one vehicle for its VIN to identify the respective target vehicle. The UAV 110 may also be operated to identify the target vehicle by capturing a digital image of one or more vehicles that are within the target location, and analyzing the digital image according to an image recognition processes to detect vehicle identifiers that may be relied on to identify the vehicles. Vehicle identifiers may include an alphanumeric VIN or other identifying set of numbers/letters (e.g., model number, license plate), or unique vehicle characteristics that may be relied upon to identify the vehicle (e.g., vehicle shape, size, unique characteristics such as wheel design, color, or specialty trim). By analyzing the vehicle identifier for one or more of the vehicles depicted in the digital image, the UAV 110 may be able to identify the target vehicle.

The UAV 110 may further be operated to travel to the target location, locate the target vehicle within the target location, and initiate a locksmith process for unlocking the target vehicle. For example, the UAV 110 may receive unlock codes for unlocking the target vehicle doors from the UAV command server 160 as part of operational commands received from the UAV command server 160. After confirming identification of the target vehicle, the UAV 110 may transmit the unlock codes to the target vehicle, similar to the wireless unlocking feature found on key fobs. The UAV 110 may transmit an unlock confirmation signal to the UAV command server 160 after confirming successful unlock of the target vehicle. In one embodiment, the timing of the UAV command server 160 sending the unlock code to the UAV 110 may be dependent on one or more conditions. For example, the UAV command server 160 may monitor the location of the UAV 110 and another electronic device, such as computing device 620, discussed below. In particular, the UAV command server 160 may monitor the locations of both the UAV 110 and the computing device 620 with respect to a target vehicle, and send the unlock code to the UAV 110 when both the UAV 110 and the computing device 620 are within a predetermined distance(s) of the target vehicle.

The UAV 110 may further be operated to travel to the target location, locate the target vehicle within the target location, and initiate an information transfer process with the target vehicle. For example, the target vehicle may be equipped with a vehicle history dongle that records vehicle characteristics while the target vehicle is operated. For example, the vehicle history dongle may record temperature readings measured by temperature sensors within an engine bay of the target vehicle. The vehicle history dongle may record vibration/shock readings measured by vibration/shock sensors (e.g., accelerometer, gyroscope, or piezoelectric sensors) on the target vehicle or included in the vehicle history dongle, where the measured vibrations or shocks may indicate an accident involving the target vehicle has occurred. The vehicle history dongle may record acceleration readings measured by an accelerometer on the target vehicle or included in the vehicle history dongle. By recording such information, the vehicle history dongle may generate a vehicle driving report for the target vehicle based on the recorded information. The vehicle driving report may describe a driving style (e.g., passive, moderate, aggressive) as well as a driving history derived from an analysis of the recorded information.

Some dongles may be equipped to start the vehicle. For example, authorized OEM dongles may be configured to start the vehicle directly or from commands received from an OnStar service. When an OnStar service or dongle is allowed to start the vehicle, the UAV 110 may subsequently detect operational issues on the vehicle after the vehicle starts its engine. For example, sniffers or smoke sensors on the UAV 110 may detect smoke from the vehicle following the vehicle start. Because the vehicle's engine has started and the vehicle may be moving, the UAV 110 may also include anti-collision software to operate the UAV 110 to avoid collision with the vehicle that the UAV 110 is observing to detect the measurements from.

The UAV 110 may be operated to generally travel to a target area (e.g., parking lot, vehicle auction lot, car dealer lot, rental vehicle lot), identify one or more vehicles within the target area, and generate a map that locates one or more of the identified vehicles to their respective location within the target area. In this way, the UAV 110 may generate an accurate map and location key identifying the location of vehicles within the target area.

The UAV 110 may further be operated to utilize attachments from an attachment assembly to obtain state measurements related to the target vehicle. For example, the UAV 110 may activate a color meter attachment to measure a paint color of the target vehicle, a thermographic camera to measure infrared radiation emitting from the target vehicle, an electronic nose device to measure odors emitting from the target vehicle, or an electronic distance measuring device to measure a distance between the target vehicle and surrounding objects.

The UAV 110 may further be operated to transmit information obtained by the UAV 110 (e.g., state information obtained by an attachment from the UAV attachment assembly, vehicle profile, or vehicle report) to another computing device for additional analysis.

The UAV 110 may further be operated to travel to a target location described as including the target vehicle, confirm the identification of the target vehicle, and capture a digital image of a driver and/or passenger of the target vehicle. The digital image may be analyzed under facial recognition software to identify the faces. The faces recognized from the digital image may be compared against a database that stores facial information of one or more known people associated with the target vehicle to verify the target vehicle is being operated or otherwise occupied by a person associated with the target vehicle. The faces recognized from the digital image may also be compared against a database that stores faces of one or more known people associated with an application to verify whether one or more faces recognized from the digital image matches up to a registered user of the application. The application may be an application being executed by the target vehicle that requires user verification, which may be verified by the UAV 110 as described. After confirming verification of the driver and/or a passenger in the target vehicle, a verification signal may be transmitted to the UAV command server 160, or another server associated with, for example, the application.

A microphone and/or speaker may be included in the UAV 110 so that the UAV 110 may recognize a driver or other person interacting with the UAV 110 or vehicle that is being observed by the UAV 110. For example, the UAV 110 may receive identification information from a person who identifies himself for authentication by the UAV 110. So when a person says "My name is Jim," this speech pattern is received by the microphone on the UAV 110 and the UAV 110 is able to run a voice recognition process on the person's voice to authenticate the person. The voice recognition process may be combined with other security features such as facial recognition and location information. For example, facial recognition may be run on the person who provided the speech pattern to better authenticate the person. In addition, location information on the person may be referenced to determine whether the person can be in their current location. For example, when the UAV 110 receives information indicating a vehicle's owner is on vacation in Mexico, and a person is attempting to authenticate themselves as the vehicle owner in Illinois, the UAV 110 will recognize the person is likely not the vehicle owner. After the UAV 110 authenticates the vehicle owner, the UAV 110 may receive voice commands from the authenticated vehicle owner to transmit to the vehicle (e.g., "unlock door"; "roll down windows"; "turn on left/right turn signals"; "rev engine to X RPM").

Figure 9:
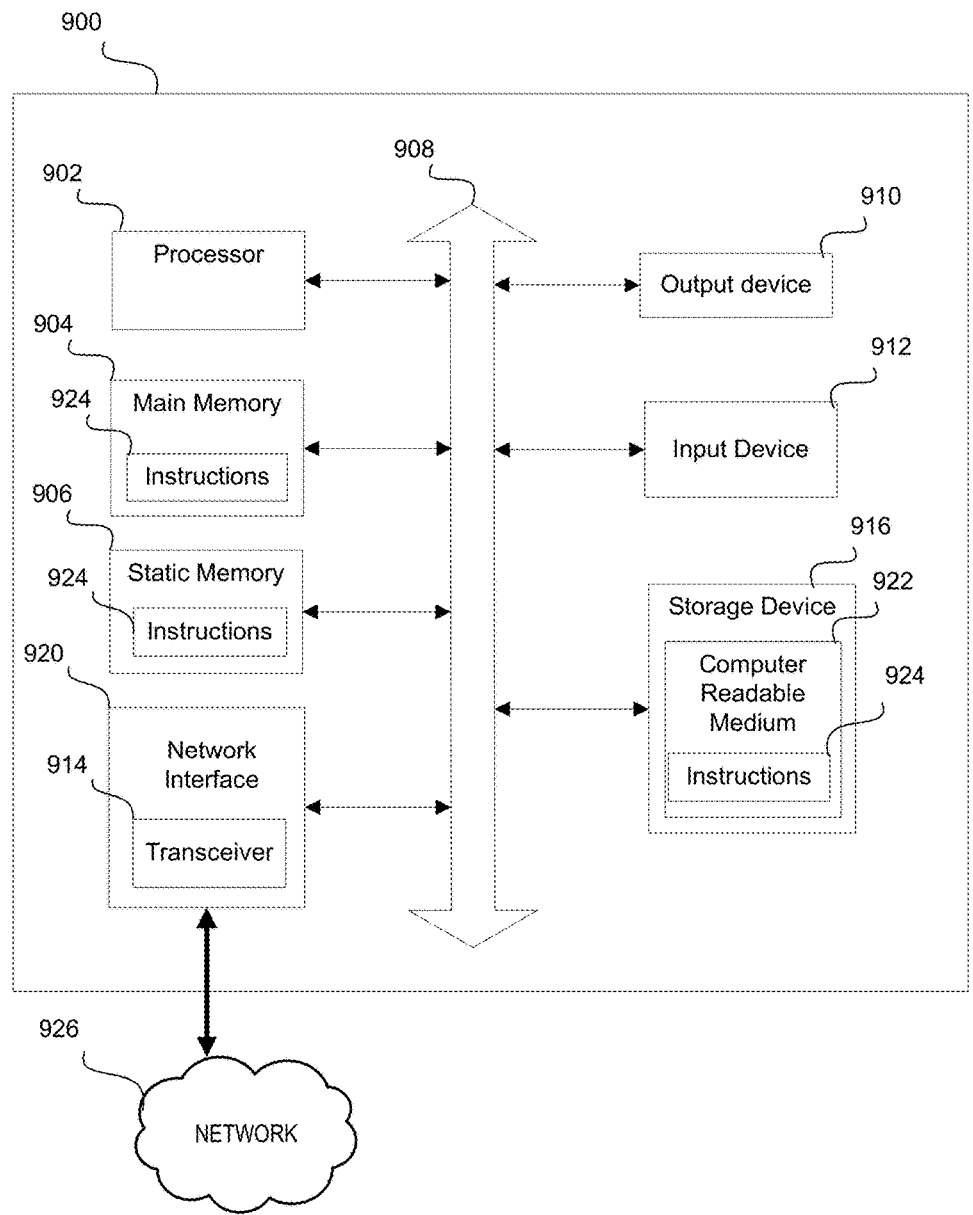
FIG. 9 shows exemplary computer architecture for a computer system.

One or more of the computing devices in the vehicle management system 100 may include one or more components described by the exemplary computer architecture of computer system 900 in FIG. 9.

Computer system 900 includes a network interface 920 that allows communication with other computers via a network 926, where network 926 may be represented by network 130 in FIG. 1. Network 926 may be any suitable network and may support any appropriate protocol suitable for communication to computer system 900. The computer system 900 may also include a processor 902, a main memory 904, a static memory 906, an output device 910 (e.g., a display or speaker), an input device 912, and a storage device 916, communicating via a bus 908.

Processor 902 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 902 executes instructions 924 stored on one or more of the main memory 904, static memory 906, or storage device 916. Processor 902 may also include portions of the computer system 900 that control the operation of the entire computer system 900. Processor 902 may also represent a controller that organizes data and program storage in memory and transfers data and other information between the various parts of the computer system 900.

Processor 902 is configured to receive input data and/or user commands through input device 912. Input device 912 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 900 and control operation of computer system 900. Input device 912 as illustrated in FIG. 89 may be representative of any number and type of input devices.

Processor 902 may also communicate with other computer systems via network 926 to receive instructions 924, where processor 902 may control the storage of such instructions 924 into any one or more of the main memory 904 (e.g., random access memory (RAM)), static memory 906 (e.g., read only memory (ROM)), or the storage device 916. Processor 902 may then read and execute instructions 924 from any one or more of the main memory 904, static memory 906, or storage device 916. The instructions 924 may also be stored onto any one or more of the main memory 904, static memory 906, or storage device 916 through other sources. The instructions 924 may correspond to, for example, instructions and/or operational commands for controlling operation of the UAV 110.

Although computer system 900 is represented in FIG. 9 as a single processor 902 and a single bus 908, the disclosed embodiments applies equally to computer systems that may have multiple processors and to computer systems that may have multiple busses with some or all performing different functions in different ways.

Storage device 916 represents one or more mechanisms for storing data. For example, storage device 916 may include a computer readable medium 922 such as read-only memory (ROM), RAM, non-volatile storage media, optical storage media, flash memory devices, and/or other machine-readable media, or any other appropriate type of storage device. Although only one storage device 916 is shown, multiple storage devices and multiple types of storage devices may be present. Further, although computer system 900 is drawn to contain the storage device 916, it may be distributed across other computer systems that are in communication with computer system 900, such as a computer system in communication with computer system 900. For example, when computer system 900 is representative of the vehicle information server 140, storage device 916 may be distributed across to include the data center 150.

Output device 910 is configured to present information to the user. For example, output device 910 may be a display such as a liquid crystal display (LCD), a gas or plasma-based flat-panel display, or a traditional cathode-ray tube (CRT) display or other well-known type of display in the art of computer hardware. Accordingly, output device 910 may be a device for displaying a user interface. In addition or alternatively, output device 910 may be a speaker configured to output audible information to the user. In addition or alternatively, output device 910 may be a haptic output device configured to output haptic feedback to the user. Any combination of output devices may be represented by the output device 910.

Network interface 920 provides the computer system 900 with connectivity to the network 926 through any compatible communications protocol. Network interface 920 sends and/or receives data from the network 926 via a wireless or wired transceiver 914. Transceiver 914 may be a cellular frequency, radio frequency (RF), infrared (IR) or any of a number of known wireless or wired transmission systems capable of communicating with network 926 or other computer device having some or all of the features of computer system 800. Bus 908 may represent one or more busses, e.g., USB, PCI, ISA (Industry Standard Architecture), X-Bus, EISA (Extended Industry Standard Architecture), or any other appropriate bus and/or bridge (also called a bus controller). Network interface 920 as illustrated in FIG. 9 may be representative of a single network interface card configured to communicate with one or more different data sources.

Computer system 900 may be implemented using suitable hardware, software and/or circuitry, such as a personal computer or other electronic computing device. In addition, computer system 900 may also be a portable computer, laptop, tablet or notebook computer, PDA, pocket computer, appliance, telephone, server computer device, or mainframe computer.

Figure 2:
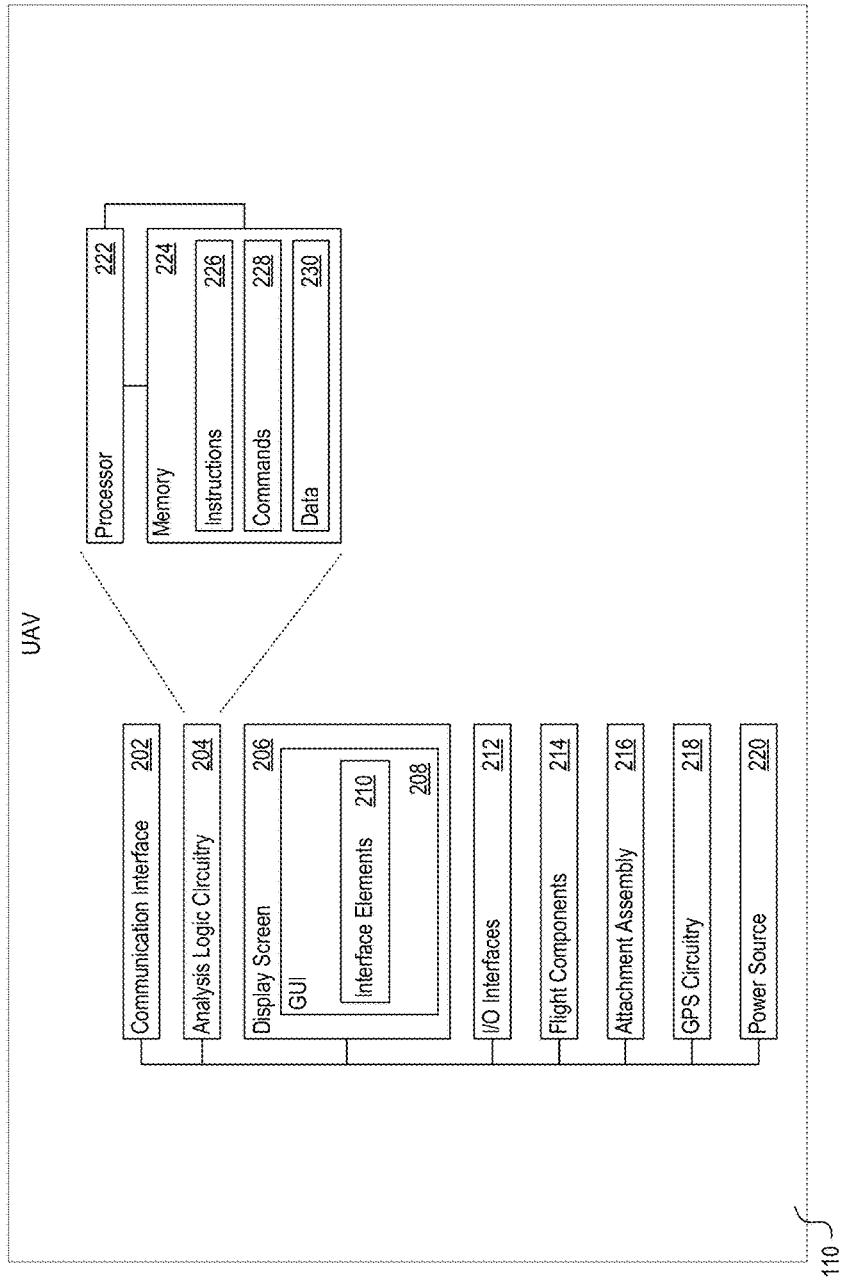
FIG. 2 shows a block diagram for an exemplary UAV.

FIG. 2 shows an exemplary block diagram for UAV 110. The UAV 110 may include a communication interface 202, analysis logic circuitry 204, and a display screen 206. The UAV 110 may further include input/output (I/O) interfaces 212, flight components 214, attachment assembly 216, GPS circuitry 218, and power source 220.

The communication interface 202 may include Universal Serial Bus (USB) interfaces, audio outputs, magnetic or optical media interfaces (e.g., a CDROM or DVD drive), network (e.g., Ethernet or cable (e.g., DOCSIS) interfaces), Serial Advanced Technology Attachment (SATA), and Peripheral Component Interconnect express (PCIe) interfaces and connectors, memory card slots or other types of serial, parallel, or network data interfaces. The communication interface 202 may include one or more Ethernet ports, or any other type of wired or wireless communication interface. For example, the communication interface 202 may include a communication interface for bi-directional communication of instructions/commands/data with the booth controller 120, UAV command server 160, and vehicle information server 140.

The display screen 206 may present, for example, a graphical user interface (GUI) 208. The GUI 208 may display and accept user parameters, and annotation commands through interface elements 210. The interface elements 210 may visualize, as just a few examples, images, input fields, or any other information or measurements captured by the UAV 110. The interface elements 210 may also be directive interface element, such as a button, hyperlink, or any other interface element to provide a command or instruction. The GUI 208 may further present the information captured by the UAV 110 as a direct display on the display screen 206, or through an aggregated information portal, such as a web page. The captured information may be annotated with further information received from the booth controller 120, UAV command server 160, and vehicle information server 140, which the analysis logic circuitry 204 may request.

The I/O interfaces 212 may correspond to the input device 912 and/or output device 910 described by the computer system 900. For example, the I/O interfaces 212 may include one or more of a keyboard, mouse, voice recognition, touchscreen, and any other type of input mechanisms for operator interaction with the UAV 110, booth controller 120, or UAV command server 160. Additional examples of the I/O interfaces 212 include microphones, video and still image cameras, temperature sensors, vibration sensors, rotation and orientation sensors, radiation sensors (e.g., IR or RF sensors), and other types of inputs.

The flight components 214 may include the hardware, software, circuitry, and mechanics enabling the UAV 110 for airborne travel. This includes one or more of propellers, motors, digital cameras, distance sensors, and/or accelerometers. In particular, the flight components 214 may include two or more propeller assemblies for enabling the UAV 110 for airborne travel.

The analysis logic circuitry 204 may include a combination of hardware, software, and/or circuitry. For example, the analysis logic circuitry 204 may include one or more processors 222 and memories 224. The memory 224 may store instructions 226 (e.g., program instructions) for execution by the processor 222. The analysis logic circuitry 204 may include an application customized for mobile devices and operating systems, such as for example Android, iOS, WebOS, Blackberry, or any other mobile device. This may allow any mobile device with the mobile application installed to effectively control the UAV 110. The memory 224 may also store the information received at the communication interface 202, such as sensor measurements captured by attachment assembly 216.

The attachment assembly 216 may include one or more attachments. For example, the attachment assembly 216 may include a digital camera to capture a digital image, a color meter to measure a paint color, a thermographic camera to measure infrared radiation, an electronic nose device to measure odors, and/or an electronic distance measuring device to measure a distance between objects.

The GPS circuitry 218 may include a transceiver for communicating location information to and from GPS 170.

Power source 220 may be a rechargeable battery such as a lead-acid based rechargeable battery, nickel cadmium (NiCd) based rechargeable battery, nickel metal hydride (NiMH) based rechargeable battery, lithium ion (Li-ion) based rechargeable battery, or lithium ion polymer (Li-ion polymer) based rechargeable battery. The power source 220 may further include solar energy capturing photovoltaic cells for assisting in the recharging of the rechargeable battery.

As will be described in more detail below, the commands 228 may include an original set of commands included with the instructions 226 for operating the UAV 110. The commands 228 may also correspond to revised commands or new commands transmitted from the UAV command server 160 during operation of the UAV 110. The measurements obtained by an attachment of the attachment assembly 216 may be stored as data 230 in the memory 224. The data 230 may further be transmitted to the booth controller 120, UAV command server 160, and/or vehicle information server 140.

Figure 3:
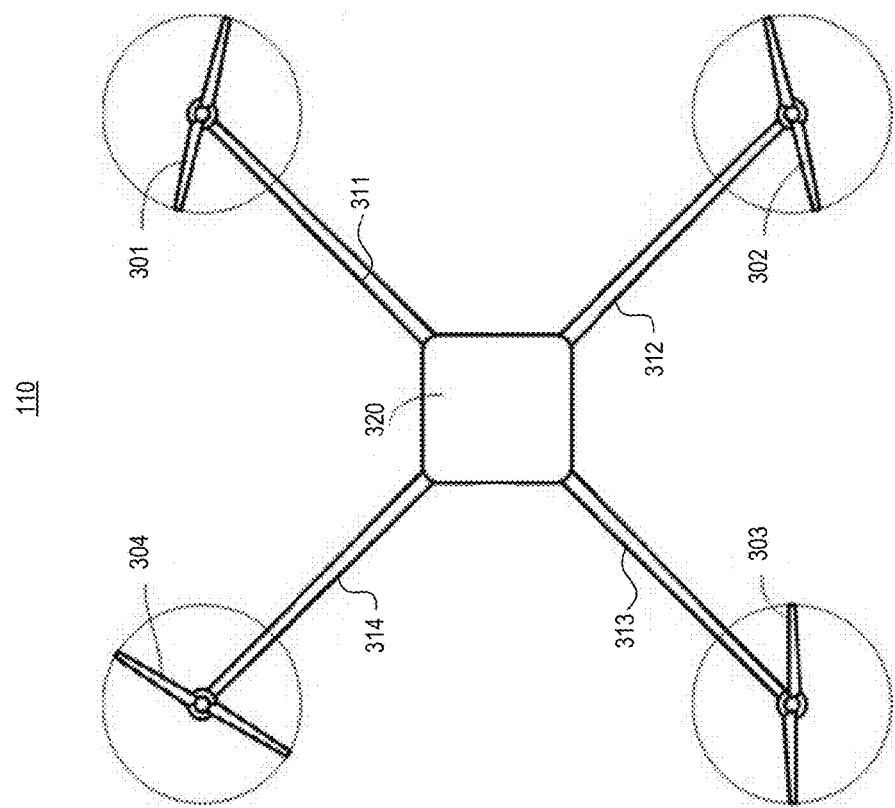
FIG. 3 shows an exemplary top down plan view of a UAV.

FIG. 3 shows an exemplary top down plan view of UAV 110. The UAV 110 includes a main body 320 that houses one or more of the components described as being included in the UAV 110 according to the description related to the exemplary block diagram for UAV 110 in FIG. 2. The UAV 110 shown in FIG. 3 also includes four propeller blades 301, 302, 303, 304, where each of the four propeller blades 301, 302, 303, 304 are connected to the main body 320 by respective control bars 311, 312, 313, 314. The UAV 110 may include a single propeller blade in a helicopter embodiment, or any number of propeller blades according to different embodiments.

Figure 4:
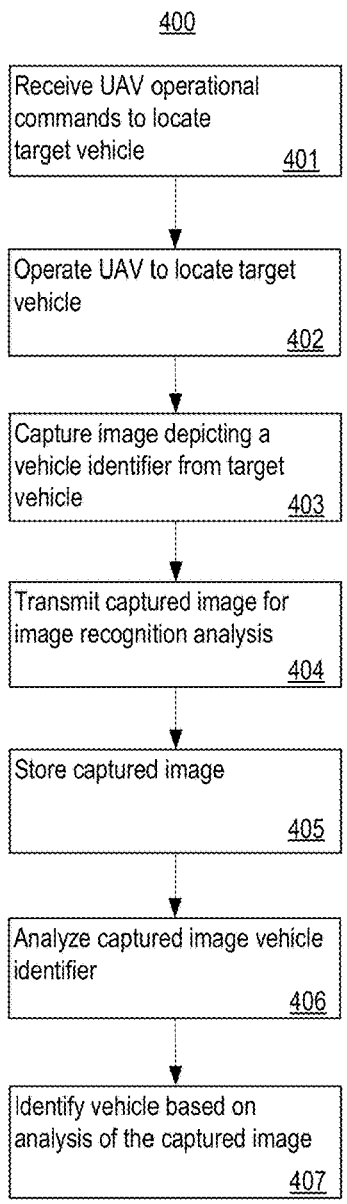
FIG. 4 shows a flow chart of logic describing an exemplary process for identifying a vehicle through the operation of a UAV.

FIG. 4 shows an exemplary flow diagram of logic 400 describing an exemplary process for identifying a vehicle through the operation of UAV 110. For example, the UAV 110 may receive, from the UAV command server 160, operational commands for locating a target vehicle (401). The operational commands may include at least a description of the target vehicle and a target location where the target vehicle is predicted to be located. The target vehicle description may include a vehicle identification number (VIN), as well as physical characteristics of the target vehicle such as color, make, model, special equipment, or known physical defects. The target location may be described in terms of latitude and longitude measurements.

Based on the information provided by the received operational commands, the UAV 110 may travel to the target location where the target vehicle is predicted to be located (402). The UAV 110 may communicate with the GPS 170 to identify its own location, as well as to identify the target location. The UAV 110 may be operating autonomously according to the received operational commands. Alternatively, the UAV 110 may be operating according to the received operational commands as well as updated operational commands continuously received from the UAV command server 160 while the UAV 110 is operational (e.g., in-flight).

After determining that the UAV 110 is at the target location, the UAV 110 may capture a digital image that depicts a vehicle identifier from a vehicle within the target location (403). The UAV 110 may determine it is at the target location by comparing location information obtained from communicating with the GPS 170 and the location information from the operational commands. The image may be captured by a digital camera included in the attachment assembly 216 of the UAV 110. The image may be initially stored within a memory of the UAV 110.

The image may be transmitted to the UAV command server 160 for image recognition analysis (404). Alternatively, the image may be transmitted to the booth controller 120 or the vehicle information server 140 for image recognition analysis. Alternatively, the UAV 110 may perform the image recognition analysis.

The image may be stored on a memory of the computing device receiving the image (405). For example, the UAV command server 160, booth controller 120, vehicle information server 140, or UAV 110 may store the image into a respective memory upon receipt.

The image may be analyzed according to known image recognition processes and algorithms (406). For example, the image may be analyzed to recognize alphanumeric characters corresponding to a vehicle identifier in the form of a VIN by comparing the shapes recognized from the analyzed image to known alphanumeric shapes. The image may also be analyzed to recognize a vehicle identifier in the form of a barcode or QR code by comparing the shapes recognized from the analyzed image to known barcode or QR code decoding algorithms. A vehicle identifier may be determined based on the analysis.

The vehicle identifier may be referenced to identify the vehicle from which the vehicle identifier was obtained (407). For example, the vehicle identifier may be compared to a database of known vehicles and their respective vehicle identifier(s) to look up the vehicle corresponding to the vehicle identifier recognized from the image. By identifying the vehicle from the vehicle identifier recognized from the image, the vehicle depicted in the image may be determined to be the target vehicle. A results message may be transmitted back to the UAV 110 that confirms whether the vehicle identified from the recognized vehicle identifier matches the target vehicle. When the vehicle identified from the recognized vehicle identifier does not match the target vehicle, the results message may additionally include an operational command to capture an image of another vehicle within the target area to implement the process for identifying a vehicle through the operation of UAV 110 described by the flow diagram of logic 400.

As described, according to some embodiments, the UAV 110 may be operated to run the image recognition analysis on the image directly, recognize the vehicle identifier from the image, and determine whether the vehicle identified from the recognized vehicle identifier matches the target vehicle.

After the UAV 110 verifies the target vehicle, additional processes specifically related to the target vehicle may be implemented. For example, the UAV 110 may communicate with the vehicle information server 140 to request a vehicle report on the target vehicle. The UAV 110 may further communicate with the UAV command server 160, the booth controller 120, or the vehicle information server 140 to request an examination report that identifies specific target vehicle related steps for examining the target vehicle. For example, when the vehicle report on the target vehicle identifies a collision to the front passenger side door, the target vehicle specific examination report will instruct the UAV 110 to examine the front passenger side door. The vehicle report may further identify an engine fire for the target vehicle, in which case the examination report may instruct the UAV 110 to examine the target vehicle's front hood. In one embodiment, the UAV command server 160 may review the vehicle report and, based on the review, instruct the UAV 110 to modify its operation (e.g., the UAV command server 160 determines, based on the vehicle report of a collision to the front passenger door, and in turn, instructs the UAV 110 to examine the front passenger door). In an alternative embodiment, the UAV 110 may review the vehicle report and, based on the review, modify its operation.

Figure 5:
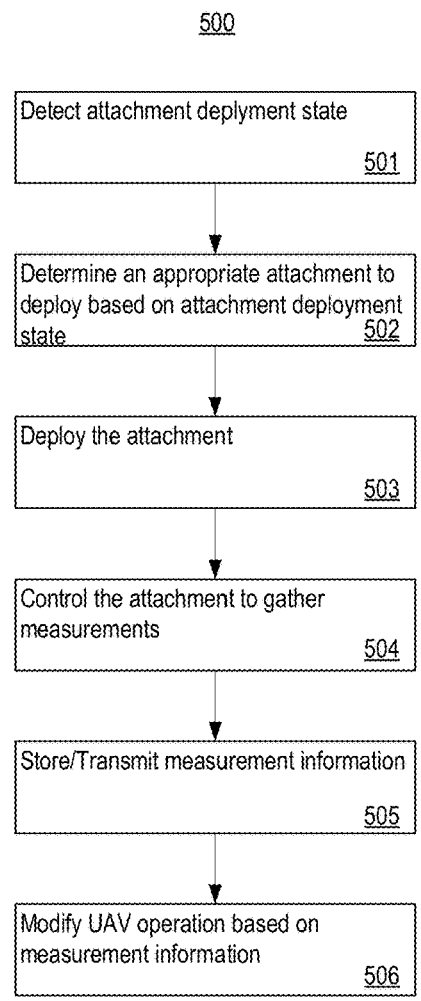
FIG. 5 shows a flow chart of logic describing an exemplary process for modifying a UAV operation based on state information gathered by an attachment of the UAV.

FIG. 5 shows an exemplary flow diagram of logic 500 describing an exemplary process for deploying an attachment from the attachment assembly 216 of the UAV 110, gathering measurements from the deployed attachment, and modifying operation of the UAV 110 based on the gathered measurements.

The UAV 110 may detect whether there is an attachment deployment state (501). The attachment deployment state may be an operational command received and executed by the UAV 110 that instructs the deployment of a specific attachment. The attachment deployment state may be related to a target vehicle presently being examined by the UAV 110. For example, the UAV 110 may examine the target vehicle by following an examination report specifically generated to account for characteristics of the target vehicle.

The UAV 110 may determine an appropriate attachment to deploy from the attachment assembly 216 based on the detected attachment deployment state (502). For example, when the examination report instructs the UAV 110 to inspect the target vehicle's front passenger side door for collision damage and front hood for fire damage, the UAV 110 may determine to deploy the digital camera to capture pictures of the front passenger side door and the front hood, and further to deploy the electronic nose device to measure odors (i.e., smoke related odors) emitted from the front hood. The UAV 110 may further deploy the color meter to measure a paint color of the front passenger side door and the front hood to detect paint variances from surrounding panels which may be referenced to determine whether new vehicle panels and parts were installed.

After determining the appropriate attachments to deploy, the UAV 110 may deploy the appropriate attachments (503).

The UAV 110 may control the deployed attachments to gather respective measurements (504). For example, digital images or videos may be captured by the digital camera attachment that depicts the target vehicle. A color measurement may be obtained by the color meter from a portion of the target vehicle. A temperature measurement may be obtained by the thermographic camera from a portion of the target vehicle. An odor measurement may be obtained by the electronic nose device from a portion of the target vehicle. A distance measurement may be obtained by the distance measuring device (e.g., sonar based device or LIDAR based device) between an object and the target vehicle. In addition or alternatively, the distance measuring device may include a passive infrared sensor, a microwave radiation sensor, an ultrasonic sensor, or a tomographic motion detector to generally detect motion.

The UAV 110 may store the measurement information for analysis by the UAV 110 (505). The UAV 110 may further transmit the measurement information to an offsite computing device (e.g., UAV command server 160, the booth controller 120, or the vehicle information server 140) for analysis by the offsite computing device (505). For example, digital images or videos captured by the digital camera attachment may be analyzed to detect specific objects depicted in the image. A color measurement obtained by the color meter may be analyzed to determine a color on a portion of the target vehicle from which the color measurement was taken. A temperature measurement obtained by the thermographic camera may be analyzed to determine a temperate of a portion of the target vehicle from which the temperature measurement was taken. An odor measurement obtained by the electronic nose device may be analyzed to determine an odor emitting from a portion of the target vehicle from which the odor measurement was taken. A distance measurement obtained by the distance measuring device (e.g., sonar based device or LIDAR based device) may be analyzed to determine a distance between an object and the target vehicle.

Operational commands for controlling the operation of the UAV 110 may be modified and/or newly generated based on the measurement information (506). For example, when an object of interest is detected from the image captured by the digital camera, the operational commands may be modified to change the flight plan for UAV 110 to travel to a different position to capture a different view of the target vehicle. When a color measured by the color meter identifies a portion of the target vehicle has a color that is different from surrounding panels, the operational commands may be modified to change the flight plan for UAV 110 to travel to a different position to capture a different view of the target vehicle. When a temperature measured by the thermographic camera identifies a portion of the target vehicle exceeds a threshold temperature, the operational commands may be modified to change the flight plan for UAV 110 to travel to a different position to capture a different view of the target vehicle or to initiate a call to emergency services. When an odor detected by the electronic nose device is determined to match up to a known harmful gas or harmful condition, the operational commands may be modified to change the flight plan for UAV 110 to travel to a different position to capture a different view of the target vehicle or to initiate a call to emergency services. When an object detected by the electronic measuring device is determined to interfere with the UAV's 110 current flight plan, the operational commands may be modified to change the flight plan for UAV 110 to travel to a different position that does not interfere with the object.

Figure 6:
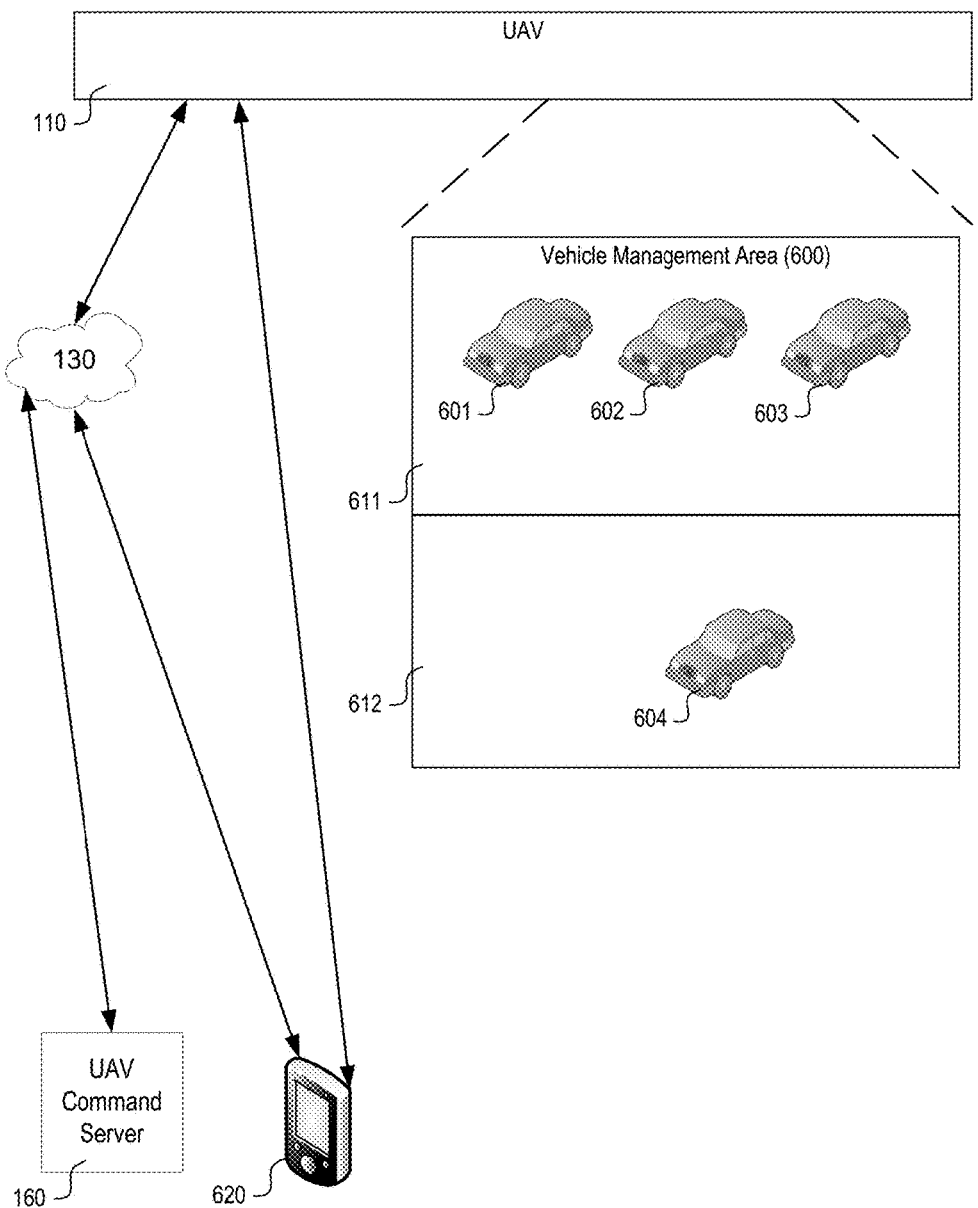
FIG. 6 shows an exemplary vehicle management area within range of a UAV.

FIG. 6 shows an exemplary vehicle management area 600. The vehicle management area 600 may be representative of, for example, a rental car lot, a car dealership lot, a parking lot, vehicle auction lot, or another target area.

Within the vehicle management area 600, there may be one or more vehicles such as vehicle 601, vehicle 602, vehicle 603, and vehicle 604. The vehicle management area 600 may further be partitioned into a plurality of sections. For example, when the vehicle management area 600 is representative of the vehicle auction lot, the partitioned sections may include a holding lot 611 and an auction area 612. The holding lot 611 may include vehicle 601, vehicle 602, and vehicle 603 that are included in the vehicle auction but not currently being bid on. The auction area 612 includes vehicle 604 that is presently being bid on.

The UAV 110 may be operated to locate and identify vehicles within the vehicle management area 600 according to any one or more of the processes described herein. The UAV 110 may further be operated to deploy one or more attachments from the attachment assembly 216 to obtain measurements from vehicles within the vehicle management area 600.

According to some embodiments, the UAV 110 may be operated according to operational commands transmitted from the UAV command server 160. According to some embodiments, the UAV 110 may be operated according to operational commands transmitted from a computing device 620 such as a laptop computer, personal computer, or smartphone. According to some embodiments, the UAV 110 may operate autonomously after receiving an initial set of operational commands from either the UAV command server 160 or computing device 620.

Figure 7:
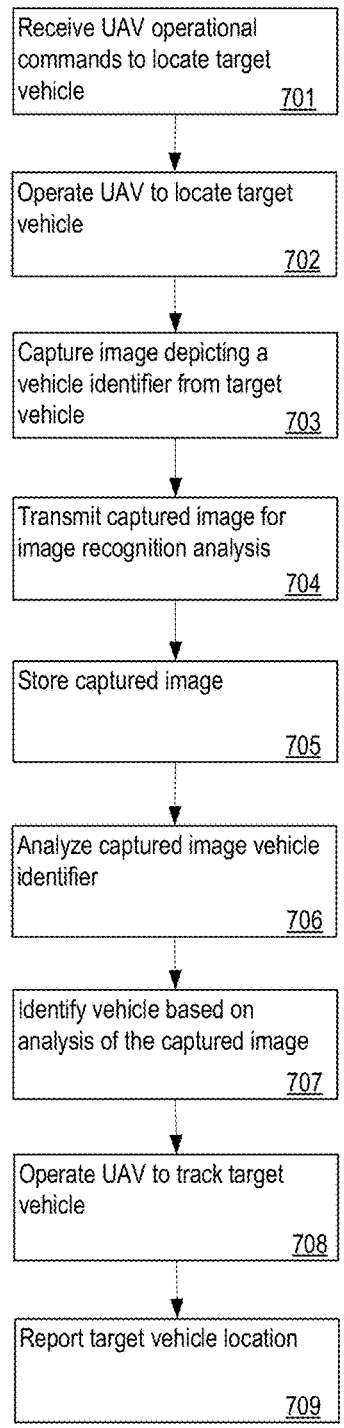
FIG. 7 shows a flow chart of logic describing an exemplary process for locating a target vehicle by a UAV.

FIG. 7 shows an exemplary flow diagram of logic 700 describing an exemplary process for identifying and tracking a vehicle through the operation of UAV 110. For example, the UAV 110 may receive, from the UAV command server 160, operational commands for locating a target vehicle (701). The operational commands including at least a description of the target vehicle and a target location where the target vehicle is predicted to be located. The target vehicle description may include a vehicle identification number (VIN), as well as physical characteristics of the target vehicle such as color, make, model, special equipment, or known physical defects. The target location may be described in terms of latitude and longitude measurements.

Based on the information provided by the received operational commands, the UAV 110 may travel to the target location where the target vehicle is predicted to be located (702). The UAV 110 may communicate with the GPS 170 to identify its own location, as well as to identify the target location. The UAV 110 may be operating autonomously according to the received operational commands. Alternatively, the UAV 110 may be operating according to the received operational commands as well as updated operational commands continuously received from the UAV command server 160 while the UAV 110 is operational (e.g., in-flight).

After determining the UAV 110 is at the target location, the UAV 110 may capture a digital image that depicts a vehicle identifier from a vehicle within the target location (703). The UAV 110 may determine it is at the target location by comparing location information obtained from communicating with the GPS 170 and the location information from the operational commands. The image may be captured by a digital camera included in the attachment assembly 216 of the UAV 110. The image may be initially stored within a memory of the UAV 110.

The image may be transmitted to the UAV command server 160 for image recognition analysis (704). Alternatively, the image may be transmitted to the booth controller 120 or the vehicle information server 140 for image recognition analysis. Alternatively, the UAV 110 may commence the image recognition analysis.

The image may be stored on a memory of the computing device receiving the image (705). For example, the UAV command server 160, booth controller 120, vehicle information server 140, or UAV 110 may store the image into a respective memory upon receipt.

The image may be analyzed according to known image recognition processes and algorithms (706). For example, the image may be analyzed to recognize alphanumeric characters corresponding to a vehicle identifier in the form of a VIN by comparing the shapes recognized from the analyzed image to known alphanumeric shapes. The image may also be analyzed to recognize a vehicle identifier in the form of a barcode or QR code by comparing the shapes recognized from the analyzed image to known barcode or QR code decoding algorithms. A vehicle identifier may be determined based on the analysis.

The vehicle identifier may be referenced to identify the vehicle from which the vehicle identifier was obtained from (707). For example, the vehicle identifier may be compared to a database of known vehicles and their respective vehicle identifier(s) to look up the vehicle corresponding to the vehicle identifier recognized from the image. By identifying the vehicle from the vehicle identifier recognized from the image, the vehicle depicted in the image may be determined to be the target vehicle. A results message may be transmitted back to the UAV 110 that confirms whether the vehicle identified from the recognized vehicle identifier matches the target vehicle. When the vehicle identified from the recognized vehicle identifier does not match the target vehicle, the results message may additionally include an operational command to capture an image of another vehicle within the target area to implement the process for identifying a vehicle through the operation of UAV 110 described by the flow diagram of logic 700.

As described, according to some embodiments the UAV 110 may be operated to run the image recognition analysis on the image directly, recognize the vehicle identifier from the image, and determine whether the vehicle identified from the recognized vehicle identifier matches the target vehicle.

After the UAV 110 verifies the target vehicle, additional processes specifically related to the target vehicle may be implemented. For example, the UAV 110 may be operated to track the target vehicle as the target vehicle travels to different locations (708). The UAV 110 may maintain a predetermined distance from the target vehicle as the UAV 110 tracks the target vehicle to different locations.

As the UAV 110 tracks the target vehicle, the UAV 110 may transmit location information back to the UAV command server 160 at predetermined time intervals (e.g., every 10 minute).

Figure 8:
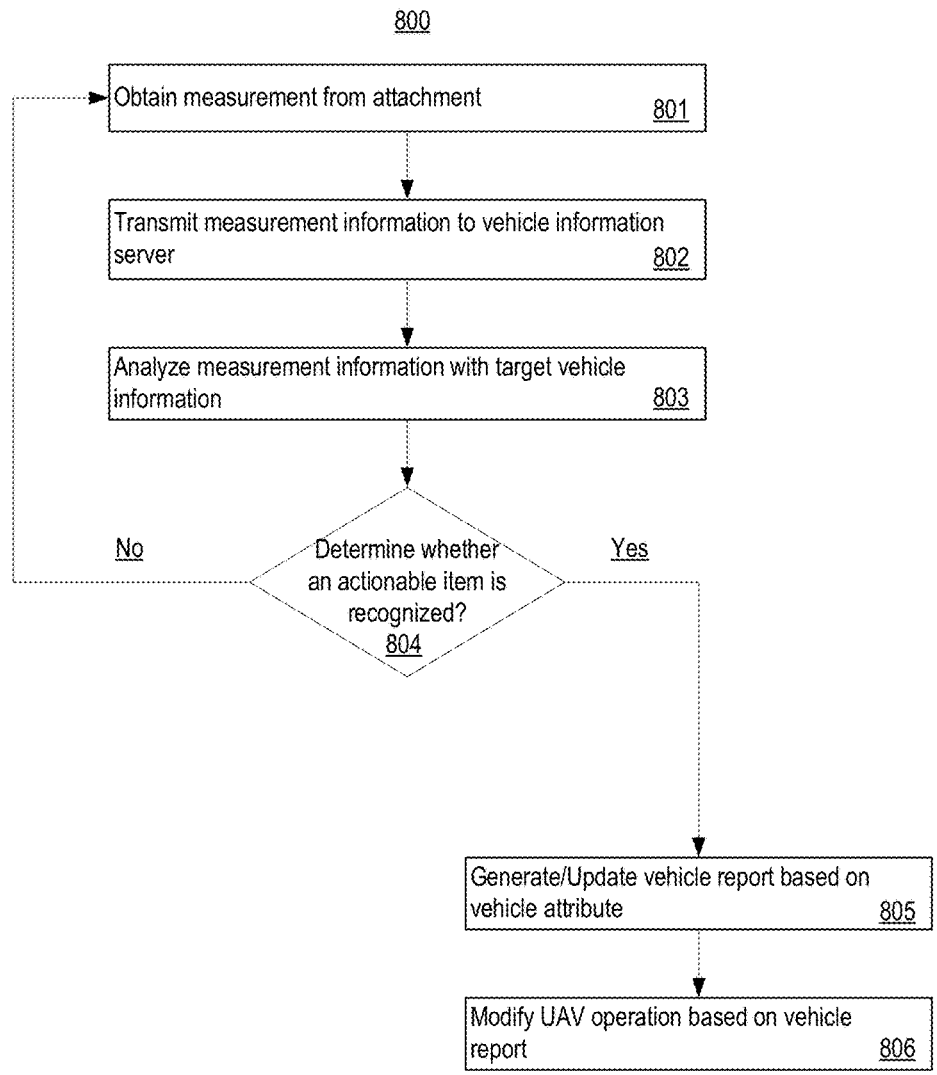
FIG. 8 shows a flow chart of logic describing an exemplary process for modifying a UAV operation based on vehicle attribute information detected by a UAV.

FIG. 8 shows an exemplary flow diagram of logic 800 describing an exemplary process for modifying operation of the UAV 110 based on vehicle attribute information detected by the UAV 110.

The UAV 110 may deploy an attachment to obtain a state observation measurement (801). The measurement information obtained by the attachment may be stored, at least temporarily, in the UAV 110.

The measurement information may be transmitted to the vehicle information server 140 (802). Target vehicle information corresponding to the vehicle from which the measurement information is obtained may further be transmitted to the vehicle information server 140. Alternatively, the measurement information and/or the target vehicle information may be transmitted to the UAV command server 160, booth controller 120, or other remote computing device. The target vehicle information may include a vehicle report on the target vehicle, as well as other information describing the target vehicle.

The measurement information may be analyzed in view of the target vehicle information by the computing device receiving such information (803). For example, the measurement information may be compared against a set of operational commands that matches a predetermined operation command for a corresponding state observation measurement.

The computing device having processed the analysis determines whether an actionable item is recognized based on the analysis (804). For example, when a comparison of the measurement information against the set of operational commands returns a match, an actionable item is determined to be recognized. As another example, recognizing a new physical characteristic of the target vehicle (e.g., new dent or scratch, new color, new accessories, new mileage) that is not identified in the target vehicle's vehicle report may be recognized as an actionable item.

The vehicle information server 140 may generate a new vehicle report or modify an existing vehicle report for the target vehicle to further describe the actionable item (805). The vehicle information server 140, or other computing device, may further generate a new or modified examination report to account for the actionable item.

Operational commands for the UAV 110 may be modified or newly generated in view of the modified or new vehicle report (806). For example, the UAV 110 or UAV command server 160 may receive the modified or new vehicle report from the vehicle information server 140, and generate new or modified operational commands for the UAV 110. The new or modified operational commands may include instructions for changing the UAV's 110 flight path, or control operation of attachments in the attachment assembly 216, to implement the operational commands corresponding to the actionable item.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry. Various implementations have been specifically described. However, other implementations are also within the scope of this disclosure.

What is claimed is:

1. An unmanned aerial vehicle (UAV) comprising:
    a network interface configured to communicate with a command server;
    an attachment assembly;
    a memory configured to store UAV operational commands; and
    a processor in communication with the memory and configured to execute the UAV operational commands to:
        control at least one attachment assembly to obtain one or more observations regarding a vehicle indicative of vehicle identification associated with the vehicle;
        control the network interface to transmit to the command server the one or more observations regarding the vehicle indicative of vehicle identification associated with the vehicle;
        receive, through the network interface from the command server, at least one modified operational command, the at least one modified operational command comprising a vehicle control command from a command server, the vehicle control command, when executed by the vehicle, configured to cause the vehicle to perform an action;
        store the vehicle control command in the memory;
        transmit, to the vehicle, the vehicle control command for execution by the vehicle; and
        responsive to transmitting the vehicle control command to the vehicle in order for the vehicle to execute the vehicle control command and thereby perform the action, receive information with regard to the action performed by the vehicle in order to determine at least one aspect of the action of the vehicle.

2. The unmanned aerial vehicle of claim 1, wherein the attachment assembly includes at least one of a digital camera to capture a digital image, a color meter to measure a paint color, a thermographic camera to measure infrared radiation, an electronic nose device to measure odors, or an electronic distance measuring device to measure a distance between objects.

3. The unmanned aerial vehicle of claim 1, wherein the attachment assembly includes a digital camera; and
    wherein the processor is configured to execute the UAV operational commands to control the digital camera to capture a digital image depicting a vehicle component; and
    wherein the processor is further configured to execute the UAV operational commands to:
        transmit, through the network interface, the digital image to the command server; and
        receive, through the network interface, confirmation from the command server that the vehicle component depicted in the digital image corresponds to a target vehicle, the confirmation including a vehicle identifier corresponding to the target vehicle recognized from the digital image; and
    wherein the processor is configured to receive the vehicle control command responsive to the command server confirming that the vehicle component depicted in the digital image corresponds to the target vehicle.

4. The unmanned aerial vehicle of claim 3, wherein the processor is further configured to execute the UAV operational commands to:
    transmit, through the network interface, a vehicle report request to a vehicle information server, wherein the vehicle report request includes the vehicle identifier; and
    receive, through the network interface, a vehicle report corresponding to the target vehicle from the vehicle information server.

5. The unmanned aerial vehicle of claim 4, wherein the processor is further configured to execute the UAV operational commands to:
    parse the vehicle report for an actionable item; and
    in response to identifying the actionable item based on the parsing, modify a flight plan of the UAV in view of the actionable item.

6. The unmanned aerial vehicle of claim 1, wherein the attachment assembly includes a digital camera; and
    wherein the processor is configured to execute the UAV operational commands to obtain the vehicle identification associated with the vehicle by:
        controlling the UAV to travel to a target location including a plurality of vehicles within a predetermined area; and controlling the digital camera to capture a digital image, the digital image depicting one or more of the plurality of vehicles within the predetermined area; and wherein the processor is further configured to execute the UAV operational commands to:
transmit, through the network interface, the digital image to the command server; and
receive, through the network interface, confirmation from the command server identifying the one or more of the plurality of vehicles depicted in the digital image.

7. The unmanned aerial vehicle of claim 1, wherein the vehicle control command is indicative to the vehicle to unlock the vehicle.

8. The unmanned aerial vehicle of claim 7, wherein, responsive to confirming successful unlock of the vehicle, the processor is further configured to transmit to the command server a confirmation of the successful unlock of the vehicle.

9. The unmanned aerial vehicle of claim 1, wherein the vehicle control command comprises an information transfer command in order to initiate an information transfer process with the vehicle; and
wherein the processor is configured to determine the at least one aspect of the action of the vehicle by receiving information from the information transfer process.

10. The unmanned aerial vehicle of claim 9, wherein the vehicle includes a vehicle dongle; and
wherein the information transfer process comprises vehicle history data received by the UAV.

11. The unmanned aerial vehicle of claim 1, wherein the processor is configured to:
responsive to transmitting the one or more observations regarding the vehicle indicative of vehicle identification to the command server, receive the vehicle control command from the command server.

12. The unmanned aerial vehicle of claim 1, wherein the vehicle control command is indicative to the vehicle to change a physical state of the vehicle; and
wherein the processor is configured to sense the change to the physical state of the vehicle.

13. The unmanned aerial vehicle of claim 12, wherein the vehicle control command is indicative to the vehicle to modify operation of an engine of the vehicle; and
wherein the processor is configured to sense the modified operation of the engine.

14. The unmanned aerial vehicle of claim 1, wherein the processor is configured to determine the at least one aspect of the action of the vehicle by communicating with a processor on the vehicle to determine whether the action by the vehicle was performed.

15. The unmanned aerial vehicle of claim 1, wherein the processor is configured to determine the at least one aspect of the action of the vehicle by using a sensor resident on the UAV to determine whether the action by the vehicle was performed.

16. The unmanned aerial vehicle of claim 1, wherein the vehicle control command is indicative to the vehicle to change a physical state of the vehicle.

17. The unmanned aerial vehicle of claim 16, wherein the vehicle control command is indicative to the vehicle to unlock the vehicle.

18. A command server, comprising:
a network interface configured to communicate with an unmanned aerial vehicle (UAV) and a vehicle information server;
a memory configured to store UAV operational commands; and
a processor configured to:
communicate with the network interface and the memory;
transmit, through the network interface, a UAV operational command to the UAV, the UAV operational command indicative to the UAV to control an attachment assembly on the UAV obtain one or more observations associated with a vehicle, the one or more observations being indicative of vehicle identification associated with the vehicle;
receive, from the UAV through the network interface, the one or more observations obtained by the attachment assembly, the one or more observations being indicative of the vehicle identification associated with the vehicle;
store the one or more observations, including the vehicle identification associated with the vehicle, obtained by the attachment assembly in the memory;
compare the vehicle identification associated with the vehicle obtained by the UAV with predetermined vehicle identification of a target vehicle;
responsive to determining, based on the comparison, that the vehicle identification associated with the vehicle obtained by the UAV matches the predetermined vehicle identification of the target vehicle, transmit, through the network interface to the UAV, a vehicle control command, the vehicle control command indicative to the target vehicle to perform an action; and
responsive to transmitting the vehicle control command to the UAV, receive, from the UAV through the network interface, information with regard to the action performed by the target vehicle in order to determine at least one aspect of the action of the target vehicle.

19. The command server of claim 18, wherein the processor is further configured to transmit, through the network interface to the UAV, a travel command, the travel command indicative to the UAV to travel to a target vehicle location corresponding to the target vehicle;
wherein the UAV operational command comprises the vehicle identification command and includes an operational command for the UAV to control a digital camera in the attachment assembly on the UAV to capture a digital image of the target vehicle;
wherein the vehicle identification comprises the digital image of the target vehicle; and
wherein the processor is configured to compare the vehicle identification with the vehicle obtained by the UAV with predetermined vehicle identification by:
applying image recognition analysis to the digital image of the target vehicle;
identifying a vehicle identifier from the digital image based on the image recognition analysis; and
determining whether the vehicle identifier corresponds to the target vehicle.

20. The command server of claim 19, wherein the processor is further configured to:
transmit, through the network interface, a vehicle report request to a vehicle information server, wherein the vehicle report request includes the vehicle identifier;
receive, through the network interface, a vehicle report corresponding to the target vehicle from the vehicle information server; and transmit, through the network interface, the vehicle report to the UAV.

21. The command server of claim 18, wherein the processor is further configured to:
monitor a location of a mobile computing device; and
determine whether the mobile computing device is within a predetermined distance of the target vehicle; and
wherein the processor is configured to transmit the vehicle control command responsive to determining that the mobile computing device is within a predetermined distance of the target vehicle and responsive to determining that that the vehicle identification associated with the vehicle obtained by the UAV matches the predetermined vehicle identification of the target vehicle.

22. The command server of claim 18, wherein the vehicle control command is indicative to the vehicle to unlock the vehicle; and
wherein the information with regard to the action performed by the target vehicle in order to determine the at least one aspect of the action of the target vehicle comprises confirmation of successful unlock of the target vehicle.

23. The command server of claim 18, wherein the vehicle control command comprises an information transfer command in order to initiate an information transfer process with the target vehicle; and
wherein the information with regard to the action performed by the target vehicle in order to determine at least one aspect of the action of the target vehicle comprises information generated by the information transfer process.

24. The command server of claim 18, wherein the processor is further configured to transmit, through the network interface to the UAV, a travel command, the travel command indicative to the UAV to travel to a target vehicle location corresponding to the target vehicle;
wherein the vehicle identification command includes an operational command for the UAV to control a digital camera resident on the UAV to capture a digital image of the target vehicle;
wherein the vehicle identification comprises the digital image of the target vehicle; and
wherein the processor is configured to compare the vehicle identification associated with the vehicle obtained by the UAV with predetermined vehicle identification by:
applying image recognition analysis to the digital image of the target vehicle;
identifying a vehicle identifier in the digital image based on the image recognition analysis; and
determining whether the vehicle identifier corresponds to a target vehicle described to be located at the target vehicle location;
wherein the processor is configured, in response to determining that the vehicle identifier corresponds to the target vehicle, transmit a vehicle un-lock code to the UAV; and
wherein the processor is configured receive the information with regard to the action performed by the vehicle by receiving, through the network interface, target vehicle un-lock confirmation from the UAV.

25. A command server comprising:
a network interface configured to communicate with an unmanned aerial vehicle (UAV) and a vehicle information server;
a memory configured to store UAV operational commands; and
a processor configured to:
communicate with the network interface and the memory;
transmit, through the network interface, UAV operational commands to the UAV, the UAV operational commands including operational commands for controlling an attachment assembly to obtain state observations, wherein the UAV operational commands include operational commands for controlling a digital camera in the attachment assembly to capture a digital image, and further include operational commands for the UAV to travel to a target vehicle location corresponding to a target vehicle;
receive, through the network interface, the state observations obtained by the attachment assembly;
store the state observations in the memory;
compare the state observations to the UAV operational commands;
when the state observations match an actionable item UAV operational command included in the UAV operational commands based on the comparison, determine an actionable item is recognized;
transmit, through the network interface, the actionable item UAV operational command to the UAV that describes the actionable item;
modify the UAV operational commands to accommodate the actionable item;
transmit, through the network interface, the modified UAV operational commands to the UAV;
apply image recognition analysis to the digital image;
identify a vehicle identifier in the digital image based on the image recognition analysis;
determine whether the vehicle identifier corresponds to a target vehicle described to be located at the target vehicle location;
in response to determining the vehicle identifier corresponds to the target vehicle, transmit a vehicle un-lock code to the UAV; and
receive, through the network interface, target vehicle un-lock confirmation from the UAV.

* * * * *